United States Patent
Aumasson

(10) Patent No.: US 9,491,174 B2
(45) Date of Patent: Nov. 8, 2016

(54) SYSTEM AND METHOD FOR AUTHENTICATING A USER

(71) Applicant: NAGRAVISION SA, Cheseaux-sur-Lausanne (CH)

(72) Inventor: Jean-Philippe Aumasson, Vuibroye (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 213 days.

(21) Appl. No.: 14/289,015

(22) Filed: May 28, 2014

(65) Prior Publication Data
US 2015/0052350 A1    Feb. 19, 2015

(30) Foreign Application Priority Data

Jun. 6, 2013   (EP) .................................. 13170745

(51) Int. Cl.
*H04L 29/06*    (2006.01)
*G06F 21/31*    (2013.01)

(52) U.S. Cl.
CPC ........... *H04L 63/0884* (2013.01); *G06F 21/31* (2013.01); *H04L 63/083* (2013.01); *H04L 63/12* (2013.01)

(58) Field of Classification Search
CPC . H04L 63/0884; H04L 63/12; H04L 63/083; G06F 21/31
See application file for complete search history.

(56) References Cited

U.S. PATENT DOCUMENTS

| | | |
|---|---|---|
| 2003/0131264 A1 | 7/2003 | Huff et al. |
| 2004/0123159 A1 | 6/2004 | Kerstens et al. |
| 2007/0234408 A1 | 10/2007 | Burch et al. |
| 2009/0150678 A1* | 6/2009 | Li ........................... G06F 21/33 713/183 |
| 2012/0144471 A1* | 6/2012 | Tsang .................... H04L 9/3226 726/7 |
| 2013/0212385 A1* | 8/2013 | Schechter ............... G06F 21/31 713/168 |

* cited by examiner

*Primary Examiner* — Mohammed Waliullah
(74) *Attorney, Agent, or Firm* — DLA Piper LLP

(57) ABSTRACT

A method for authenticating a user having a first enrollment step including: receiving by a first server an identifier and a password, and sending this information to a second server; on the second server: loading a security parameter, calculating a first cryptogram on the identifier, the password, and the security parameter, encrypting at least the identifier and the password, storing the encrypted data, sending the first cryptogram to the first server and storing said cryptogram on the first server; and a second verification step including: receiving by the first server the current identifier and the current password, and sending the information to the second server; on the second server calculating a second cryptogram on the current identifier, the current password, and the security parameter and sending the second cryptogram to the first server and verification that the first cryptogram is included in the database, if not, generating an error message.

12 Claims, 1 Drawing Sheet

SYSTEM AND METHOD FOR AUTHENTICATING A USER

INTRODUCTION

The present application relates to systems or methods for user authentication when he wishes to access a remote service.

BACKGROUND

Many on-line services require a user identification and authentication when the latter whishes to access a private part of such service, for instance to access its Facebook™ space or to be able to read its messages. In order to do this, the user is required by the server of said service to give an identifier and a password.

These data are verified with those of reference stored by the server, on the one hand for checking that the identifier is well indexed in the server and on the other that the password corresponds to that of reference. Once these verifications had been done, the server authorizes the access to the service to said user.

PRIOR ART

The current solutions have already taken into account the risks of storing this information unscrambled in a database, even if the latter is protected. And that is why a first approach consists of carrying out a hashing function (one-way function) such as SHA-1 or MD5 on the identifier and the password, and to store both pieces of information in this form: it should be noted that these hashing functions are deemed to be of one-way, i.e. that it is not possible to calculate the original value with the hash value.

Nevertheless, it has been found that during a data theft, some specialized tools (for example brute force attack, dictionary attack) enabled by successive trials to find the unscrambled password. The use of more expensive cryptographic functions to be assessed, for example the standard NIST PBKDF2, have rendered these attacks less effective.

Another approach is the storage of these sensitive data in a material security element in encrypted form. The imagination and determination of the hackers is unlimited and even such security elements are not protected from theft.

In these different approaches, the sensitive data are stored in a unique place that will therefore draw the attention of the hackers with the aim of illegitimately obtaining private information about users.

Another problem that the present invention proposes to solve relates to the updating of password security. Indeed, if a server wishes to modify the hashing function with a new function offering more security, it is necessary for each user to be warned in order to identify himself with its password, the latter being verified thanks to the first hashing function. Then the user is invited to enter a new password that will be encoded by the second hashing function and next stored. Such an updating is typically motivated by the need to be adapted to the computing power of the attackers as well as that of the legitimate user.

The document US 2007/0234408 describes a method for authenticating a first user (first principal) while accessing a target resource (second principal). According to an embodiment, the authentication service receives a first set of credentials such as username and password. After successful verification of the first set of credential, the target resource can identify the requestor and access its private data. The authentication service requests then second set of credentials which are related to the identification resulting from the first set of credential.

The document US 2003/0131264 describes a system and method for allowing roaming of a subscriber and password authentication in a non-LDAP region (for Lightweight Directory Access Protocol). A user signs onto a network access server which in turn connects to the regional LDAP RADIUS server. Password authentication occurs by hashing a transmitted password and comparing it to a clear text password from an LDAP database that has been hashed in the same manner as the transmitted password. When the subscriber is in a non-LDAP region, the password proceeds trough a proxy server to a regional RADIUS server which connects to a non-LDAP server. The non-LDAP server connects to and SMS database and retrieve the clear text password associated with the non LDFSAP user, hashes it according the same method as the transmitted hashed password and formats the password for comparison in the regional RADIUS server. If the hashed passwords compare, the access is permitted.

The document US2004/0123159 describes a method, system and apparatus for avoiding the use of a web-server or generic security when providing network administration services remotely to managed entities using wireless technology. Instead a true Proxy device, not operating as a web-server, is used to preprocess all command traffic from Wireless Input Devices (WID). The intervention between the WID and the managed entities of the Proxy isolating the managed entities from the WID, enhanced by encoding using a novel messaging protocol, further enhanced by a novel security model based on multiple pre-shared keys and algorithms together with identifiers and passwords that are not transmitted, achieves several bandwidth and security advantages including the ability to deliver TELNET services across the Internet and behind a firewall.

BRIEF DESCRIPTION OF THE INVENTION

This invention has two purposes, namely, on the one hand the reinforcement of security for the protection not only of the password but also of the user identifier; and on the other hand to enable an updating of the security without needing the user intervention. These purposes can be pursued separately or in combination.

The invention proposes a method for a user authentication implementing a first server connected to a public network and a second server, connected to the first server but not connected to the public network, this method comprising an enrolment step comprising:
  receiving by the first server a reference identifier U and of a reference password P,
  transmitting the reference identifier U and the reference password P to the second server,
  loading a security parameter R by the second server,
  calculating a first cryptogram H by a one-way function Hash on the reference identifier U, the reference password P, and the security parameter R by the second server,
  encrypting at least the reference identifier U and the password P by using an asymmetrical encryption method by taking a public key as an argument, and storing the data encrypted by the second server
  returning to the first server of the first cryptogram H and storing said cryptogram by the first server, and a verification step of a user comprising:
  receiving by the first server the current identifier U' and the current password P',
  transmitting the current identifier U' and the current password P' to the second server,
  calculating a second cryptogram H' by the one-way function Hash on the current identifier U', the current password P', and the security parameter R by the second server,
  returning the second cryptogram H' to the first server and verifying that the first cryptogram is included in the database, if not, generating an error message.

This present invention is based on the use of two servers, none having the totality of the data concerning a user. The first server includes a first database and the second server includes a second database.

In particular, the frontal server (or first server), in communication with the public network, does not dispose of sensitive information able to be useful to a malicious third party if these data were pirated.

The first server stores in the first protected database a recording per user, this recording comprising, according to a first version, only the first cryptogram H.

The second server stores in the second protected database the security parameter R and an encryption of the triple identifier, password, and security parameter.

It should be noted that the one-way function is only known by the second server, this function being able to be initialized by a secret key only known by the second server.

BRIEF DESCRIPTION OF THE DRAWINGS

This invention will be better understood thanks to the annexed figures in which.

DETAILED DESCRIPTION

The system of the invention includes at least two servers, the first server S1 (front-end) being accessible by one or more users and the second server S2 (back-end) being locally connected to the first server S1. The connection between the first server and the second server is protected, i.e. the confidentiality and the integrity of the exchanged data are assured. Each of these servers has a database for storing the data used for a user authentication.

Once the system is implemented, the second server initializes the security parameter R that will be stored in the second protected database of said server. It should be noted that this parameter may depend on the required application, in the case where the first server offers more than one service. This is the case for example for a bank that offer a management access to a private account, or a trading account. In this case, each of these services may correspond to a different security parameter.

In order to allow the second server to select the correct parameter, the first message sent from the first server to the second server will also comprise the type of service for which the authentication is required if several services are controlled by the second server.

Enrollment

Figure 1:
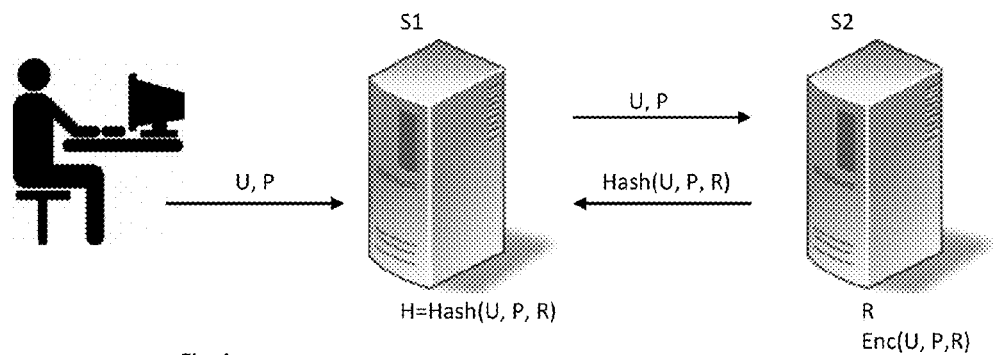
FIG. 1 shows the step of enrollment.

The first step is the registration of a user in the system such as illustrated by FIG. 1. In a conventional way, this user is invited to introduce an identifier of reference U and a password of reference P in an interface of the first server S1. Both pieces of information are transmitted to the second server S2 via the secure connection. The first server can add additional information such as the type of service and/or a system ID identifier assigned to this user for the proposed service. The identifier of reference U is the one known by the user while the system ID identifier is a number or alphanumeric sequence of the system proposing the service. The system identifier is unique for the user.

Once this information if received by the second server S2, the latter determines the security parameter R and carries out the one-way function Hash on the identifier of reference U and the password P. The result is a cryptogram H=Hash(U, P, R). This result H is transmitted to the first server S1 that will store it in its secure database.

The second server S2 also encrypts the identifier of reference U and the password P with an asymmetrical encryption method taking a public key stored by said server S2 as an argument, the corresponding private key being stored in a secure manner outside the network (for instance in a physical coffer). Alternatively, the encrypted unit can comprise the security parameter R thus allowing knowing which parameter has been used for this user.

Said asymmetrical encryption method can be for example based on RSA, or on elliptic curves.

As mentioned above, the first server S1 stores the first cryptogram H in its secure database. Thus, during the verification, the first server, after receiving the second cryptogram H' from the second server, will scan its database in order to determine if a first cryptogram H has the same value as the second cryptogram H' and thus determine if the authentication was successful.

In this embodiment, it is possible to add a verification before accepting the data chosen by the user, i.e. to verify that the first cryptogram H of this user does not already exist in the database. In this case, the user is asked to choose another password for example.

According to a variant of the invention, it is possible to store for each first cryptogram H the identifier of reference U or a derivative U'' of this reference identifier. Other information, in particular the password of reference P, is deleted at the end of the enrolment phase.

The derivative U'' of the current identifier U is a value resulting from a cryptographic operation on the current identifier U. This can be an encryption function F or a hashing function H1. In this second case, as the hashing operation carried out by the second server is not known by the first server, it will be a function of a different hashing type.

Authentication

Figure 2:
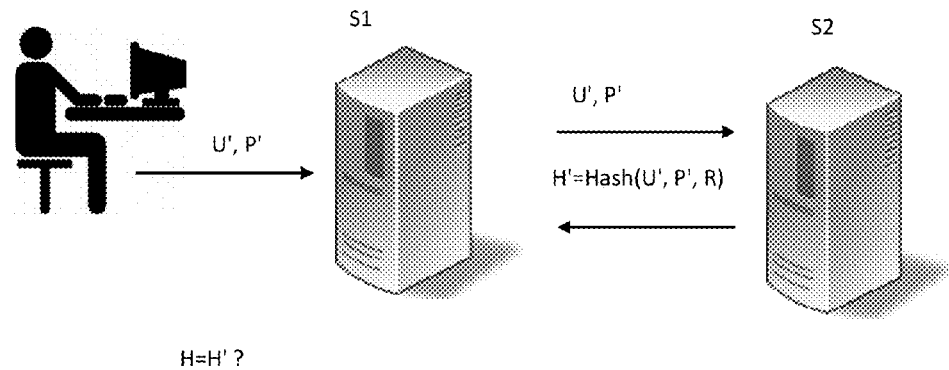
FIG. 2 shows the step of verification.

This step is shown in FIG. 2. In a second time, the user connects to the first server S1 to access the desired service. The first server S1 receives the current identifier U' and the current password P'. The first server S1 transmits this information to the second server S2 in a secure manner. Once received by the second server, the latter carries out the Hash one-way function on the current identifier U' and the password P' as well as the security parameter R for obtaining a second cryptogram H'. It returns this cryptogram H' to the first server S1. The latter searches in its database if there is a first cryptogram equal to the second cryptogram, and generates an error message, if and only if there is no trace of this cryptogram H'. In the other case, the first server S1 can authorize the access to the desired service.

If only the cryptograms H users having passed the enrolment phase are stored in the first server S1, this verification step of the existence of an entry in its database cannot be achieved before the transmission of the data to the second server. Indeed, the first server S1 cannot determine if the current identifier has been registered in the system. The same operations being realized for a registered identifier than for an unregistered identifier, it is impossible to use the system as an oracle in order to determine if an identifier has been registered.

If the first server is connected to several computers for the implementation of the service, the first server will transmit the current identifier U' (which is the same as the reference identifier U' since the comparison is positive) to the computers with a positive authentication information. If the pool of computers operates with a unique system identifier ID, the first server S1 has a database organized as a recording collection, each user representing a recording. A recording includes a first cryptogram H and a corresponding system identifier ID. In case of positive verification, the first server sends to a service server the system identifier (ID) with a message certifying the positive verification of the current identifier (U").

In the variant wherein the first server keeps with the first reference cryptogram H, the identifier of reference U (or the derivative of the reference identifier U"), the database scanning of the first server is not necessary as the reference cryptogram H can be found directly. If the secure database of the first server contains the derivative U" of the identifier of reference U, the first server will carry out the cryptographic operation on the current identifier U' in order to obtain the current identifier derivative and use this data to find the cryptogram of reference H. The comparison can thus be achieved between the first cryptogram of reference H and the second current cryptogram H' received from the second server S2.

If there is no trace of this identifier, it generates an error message. It should be noted that this verification step of the existence of an entry in its database can be carried out before transmitting the data to the second server. Indeed, if the current identifier is not known by the first server, it will not be necessary to verify the password that has been introduced by the user.

Password Updates

A particularity of the system is to enable security mean updates without modifying the password value. For example it is desired to change the security parameter R or the one-way function Hash.

For this purpose, the second server S2 has the identifier of reference U and the password P in an encrypted form. The private key corresponding to the asymmetrical key used for the encryption is extracted from the protected place where it was stored and made available to the second server S2.

The process is as follows:
the second server decrypts a identifier/password pair and calculates the first cryptogram as during the enrolment phase. Moreover, it calculates a new reference cryptogram H" on the basis of a new value of the security parameter R' or uses a new one-way function or even a combination of both. This new cryptogram H" is sent to the first server S1 with the first cryptogram H. If the security parameter R was included with the identifier/password pair, it is also decrypted.
the server S2 also encrypts the reference identifier U and the password P according to the new parameters (one-way function and/or security parameter) with the asymmetrical encryption method taking a stored public key of said server S2 as an argument, the corresponding private key being stored in a protected way outside the network (for instance in a physical coffer). Alternatively, the encrypted unit can comprise the security parameter R thus allowing to know which parameter has been used for this user. These new coded data are stored in the database of the second server S2.
upon receipt of both cryptograms, the first server S1 searches the reference cryptogram H stored in its database and replaces it by the new cryptogram H. Thus, the security means can evolve without requesting the users to re-input a password.

Security Parameter

Several versions can be provided in the scope of the present invention for the security parameter R. As mentioned above, this may be a parameter of the second server S2 and thus stored in its secure memory. It is used for all the calculations of cryptogram H, H'.

The main object of the security parameter R is to adapt the calculation cost of the Hash function to the technology of the attackers as well as that of the server. For example, and respectively, when a new dictionary attack method is discovered, or when the server S2 material is updated with a more powerful processor. The calculation cost concerns for example the number of arithmetic operations or the storage capacity (memory) necessary for the function assessment.

According to a variant, this parameter can vary according to the type of service required by the user, and an information indicating the type of service Sn is associated to the identifier/password pair transmitted to the second server by the first server. This allows to find the security parameter of this service (R1, R2 . . . Rn) in the secure memory of the second server used for the cryptogram calculation.

According to another embodiment, the security parameter R is specific to a reference identifier Un and thus specific to a user. During the enrolment phase, a parameter Rn is generated by a random function by the second server S2 upon receipt of the identifier/password pair. It is therefore necessary for the second server S2 to be able to find the security parameter Rn during the authentication phase. For this purpose, the second server will memorize the security parameter Rn specific to an identifier Un in its database. Of course it can simply store the Un, Rn pair in a secure memory. Nevertheless, it would be better for the identifier Un not to be stored unscrambled and thus a one-way function H' is carried out on the identifier Un in order to obtain a cryptogram H'(Un). The secure memory of the second server will store the H'(Un), Rn pair.

Even if these data had to be extracted from the memory by an attacker person, it will not be possible to find the value of the identifier Un.

During the authentication phase, the second server, once it has received the current identifier/password pair from the first server, carries out the one-way function H' on the current identifier U'. Thus it will be able to find in its database the security parameter Rn related to this identifier and to calculate the cryptogram C'.

One-Way Function

There are several types of one-way function. A particular function is called hashing function, which, from a provided incoming data, calculates a pattern used to identify rapidly, although not completely, the initial data. The hashing functions are commonly used for the structure implementation of cryptographic data and protocols.

A password should not be stored unscrambled on a machine for security reasons. Only the result of the password hashing is thus stored. To identify a user, the computer compares the pattern of the original password (stored) with the pattern of the requested password. However, this way of working is not completely satisfactory. If two users decide to use the same password, then the hash will be identical. This fault is potentially usable for three methods:
dictionary attack
brute force attack
rainbow table attack During a dictionary attack, one could rationally deduce that the password selected by both users is relatively easy to memorize.

To counteract this kind of attack, a random component is added (security parameter R) during the initial generation of the pattern. This component, also called <<sel>>, is often stored unscrambled. The password is then mixed with the security parameter R, this step varies depending on the system. A simple method is to concatenate the password with the security parameter R. if the security parameter R is not identical for two users, two different signatures will be obtained with the same password. This strongly reduces the margin of an attack via a rainbow table, but does not protect against dictionary or brute force attacks.

The algorithms SHA-1 (Secure algorithm hash 1: 160 bit) and MD5 (more old and less sure Message-Digest algorithm 5,128 bit) are hashing functions frequently used. The standard SHA-2 and SHA-3 (224, 256, 384, or 512 bit) are available for replacing SHA-1.

There are also hashing functions depending on a key. This is the case for example of the algorithm HMAC-SHA-1, which uses SHA-1 in the construction HMAC in order to accept a key as a parameter. The security parameter R can play the role of the key in this kind of function depending on a key.

Other optimized cryptographic algorithms for the passwords such as bcrypt or scrypt can be used. Bcrypt is a cryptographic function created by Niels Provos and David Mazières and is based on the algorithm of Blowfish encryption. As well as the use of a security parameter for protecting by rainbow table attacks (rainbow table), bcrypt is an adaptive function, i.e. that it is possible to increase the number of iterations for rendering it slower. Thus it continues to resist to attacks by exhaustive research despite the increase of the computing power.

The invention claimed is:

1. A method for user authentication performed by a first server connected to a public network and a second server, connected to the first server but not connected to the public network, the method comprising:
an enrolment step comprising:
receiving by the first server a reference identifier and a reference password;
transmitting the reference identifier and the reference password to the second server;
loading a security parameter by the second server;
calculating a first reference cryptogram by a one-way function on the reference identifier, the reference password, and the security parameter by the second server; and
returning the first reference cryptogram to the first server and storing said reference cryptogram in the first server without a direct link to the reference identifier or a derivative of the reference identifier; and
a verification step of a user comprising:
receiving by the first server the current identifier and the current password;
transmitting the current identifier and the current password to the second server;
calculating a second cryptogram by the one-way function on the current identifier, the current password and the security parameter by the second server; and
returning the second cryptogram to the first server, performing a verification that the second cryptogram is included in the database of the first server by scanning the database to find the first reference cryptogram identical to the second cryptogram, and generating an error message if the second cryptogram is not included in the database of the first server.

2. The method according to claim 1, further comprising encrypting at least the reference identifier and the password using an asymmetrical encryption method by taking a public key as an argument, and storing the encrypted data in the second server.

3. The method according to claim 2, wherein the second server includes the security parameter in the encryption of the reference identifier and the password.

4. The method according to claim 2, further comprising the step of renewing the reference cryptograms stored in the first server, by using a new one-way function and/or a new security parameter, the renewing step comprising the steps of:
obtaining by the second server the private key corresponding to the public key;
decrypting the reference identifier and the password with the private key;
calculating the first reference cryptogram by the one-way function on the reference identifier, the reference password, and the security parameter by the second server;
calculating a new cryptogram by the new one-way function on the reference identifier, the reference password, and the new security parameter by the second server;
sending the first cryptogram and the new cryptogram to the first server; and
replacing the first reference cryptogram in the first server with the new cryptogram.

5. The method according to claim 1, wherein the first server, during the enrolment, stores a record comprising the first reference cryptogram and a system identifier and if the verification is positive, sends to a service server the system identifier with a message certifying the positive verification of the current identifier.

6. The method according to claim 1, wherein the communication between the first server and the second server is encrypted.

7. A system for user authentication comprising:
a first server connectable to a public network, the first server comprising a first database; and
a second server comprising a second database, said second server being connected to the first server but not connected to the public network;
wherein the first server is configured to execute the steps of:
receiving a reference identifier and a reference password;
transmitting the reference identifier and the reference password to the second server;
receiving and storing in the first database a first reference cryptogram based in part on said reference identifier and said reference password, said first reference cryptogram being stored without a direct link to the reference identifier or a derivative of the reference identifier;
receiving a current identifier and a current password;
transmitting the current identifier and a current password to the second server;

receiving a second cryptogram based in part on said current identifier and a current password;

verifying in the first database the presence of one of said first reference cryptograms of same value as the second cryptogram by scanning the first database to find the first reference cryptogram identical to the second cryptogram, and in the positive case; and sending a message confirming the positive verification; and wherein the second server is configured to execute the steps of:

receiving the reference identifier and the reference password from the first server;

loading a security parameter;

calculating the first reference cryptogram by a one-way function on the reference identifier, the reference password, and the security parameter;

returning the first cryptogram to the first server;

receiving the current identifier and the current password from the first server;

loading the security parameter;

calculating the second cryptogram by the one-way function on the current identifier, the current password and the security parameter; and returning the second cryptogram to the first server.

8. The system of claim 7, wherein the second server includes the security parameter in the encryption of the reference identifier and the password.

9. The system of claim 7, wherein the first server, during the enrolment, stores a record comprising the first cryptogram and a system identifier and, in a case of a positive verification, sends to a service server the system identifier with a message certifying the positive verification of the current identifier.

10. The system of claim 7, further comprising the step of encrypting the reference identifier and the password using an asymmetrical encryption method taking a public key as an argument, and storing these encrypted data in the second database.

11. A method for user authentication comprising the steps of:

performing an enrolment of a user, the enrolment comprising receiving from a user by a first server a reference identifier and a reference password;

transmitting the reference identifier and the reference password to a second server, the second server being connected to the first server but not to a public network;

receiving from the second server by the first server a reference cryptogram, the reference cryptogram being calculated by a one-way function on the reference identifier, the reference password, and a security parameter not known to the first server; and storing the reference cryptogram in a first database at the first server, the first reference cryptogram being stored without a direct link to the reference identifier or a derivative of the reference identifier; and performing a verification of a user, the verification comprising receiving from a user by a first server a current identifier and a current password;

transmitting the current identifier and the current password to the second server;

receiving from the second server a second cryptogram, the second cryptogram being calculated by a one-way function on the current identifier, the current password, and the security parameter; and scanning the first database to find the first reference cryptogram identical to the second cryptogram and, if the second cryptogram matches the reference cryptogram, indicating that the current identifier and the current password have been verified.

12. The method according to claim 11, further comprising the steps of:

receiving a new cryptogram from the second server, the new cryptogram being based in part on the reference identifier and the reference password, the new cryptogram being different from the first cryptogram; and replacing the reference cryptogram with the new cryptogram in the first database of the first server.

* * * * *